US012778027B2

(12) United States Patent
Figgins et al.

(10) Patent No.: US 12,778,027 B2
(45) Date of Patent: Nov. 3, 2026

(54) ROUND BALE EJECTION AUTOMATION

(71) Applicant: CNH Industrial America LLC, New Holland, PA (US)

(72) Inventors: Ryan Figgins, New Holland, PA (US); Scott Simmons, Lititz, PA (US); Kevin Smith, Narvon, PA (US); Albert Childs, Meadville, PA (US); Rory Chisholm, Denver, PA (US)

(73) Assignee: CNH Industrial America LLC, New Holland, PA (US)

(*) Notice: Subject to any disclaimer, the term of this patent is extended or adjusted under 35 U.S.C. 154(b) by 493 days.

(21) Appl. No.: 18/231,979

(22) Filed: Aug. 9, 2023

(65) Prior Publication Data

US 2025/0048969 A1 Feb. 13, 2025

(51) Int. Cl.

| | |
|---|---|
| ***A01F 15/08*** | (2006.01) |
| ***A01F 15/07*** | (2006.01) |
| *A01D 85/00* | (2006.01) |

(52) U.S. Cl.

CPC .......... *A01F 15/0883* (2013.01); *A01F 15/07* (2013.01); *A01F 15/0765* (2013.01); *A01D 2085/007* (2013.01); *A01D 2085/008* (2013.01); *A01F 2015/074* (2013.01)

(58) Field of Classification Search

CPC ........ A01D 2085/007; A01D 2085/008; A01F 15/0883; A01F 15/07; A01F 15/0765; A01F 2015/074

See application file for complete search history.

(56) References Cited

U.S. PATENT DOCUMENTS

| | | | | |
|---|---|---|---|---|
| 7,353,753 B2 | 4/2008 | Viaud | | |
| 7,530,215 B2 | 5/2009 | Guiet et al. | | |
| 8,776,679 B1 * | 7/2014 | Henry | ................ | A01F 15/0883 100/88 |
| 8,991,308 B2 | 3/2015 | Roberge et al. | | |
| 9,930,834 B2 | 4/2018 | Chaney et al. | | |

(Continued)

FOREIGN PATENT DOCUMENTS

| | | |
|---|---|---|
| EP | 2384617 A1 | 11/2011 |
| EP | 2760273 A1 | 8/2014 |

(Continued)

*Primary Examiner* — Nicole Coy
*Assistant Examiner* — Jennifer A Railey
(74) *Attorney, Agent, or Firm* — Buchanan Ingersoll & Rooney PC

(57) ABSTRACT

A crop bale ejecting method comprising: opening a baler tailgate to a first position; ejecting the bale from the chamber; reducing/stopping rearward momentum of the bale; moving the tailgate to a second position not in contact with the bale; moving the baler forward; and closing the tailgate. Reducing/stopping the bale momentum comprises one or more of: opening the tailgate to the first position and stopping at the first tailgate position with the bale contacting the tailgate then moving the tailgate to the second position; opening the tailgate at a reduced speed to the first position then opening the tailgate at an increased speed to the second position after the tailgate clears the bale, and positioning a tailgate ramp horizontally or inclined downward in the forward direction to receive the bale as the bale ejects from the baling chamber. A crop baler configured to perform the method is also provided.

16 Claims, 6 Drawing Sheets

(56) References Cited

U.S. PATENT DOCUMENTS

| | | | |
|---|---|---|---|
| 11,129,334 B2 | 9/2021 | Gresset et al. | |
| 2003/0024407 A1* | 2/2003 | Ehrenpfort | A01F 15/0883 100/8 |
| 2019/0053434 A1 | 2/2019 | Reijersen Van Buuren | |
| 2019/0327901 A1* | 10/2019 | Gresset | A01F 15/0883 |
| 2021/0084825 A1* | 3/2021 | Kurata | A01F 15/0833 |
| 2022/0309262 A1* | 9/2022 | Herbers | G06K 19/0723 |

FOREIGN PATENT DOCUMENTS

| | | | |
|---|---|---|---|
| EP | 3338534 A1 | 6/2018 | |
| NL | 2017531 B1 * | 4/2018 | A01F 15/0705 |

* cited by examiner

ROUND BALE EJECTION AUTOMATION

FIELD OF THE INVENTION

This patent application relates to agricultural baling equipment.

BACKGROUND OF THE INVENTION

Baling machines are widely used in agriculture to bale crop material in fields into bales that may be conveniently and effectively handled, stored and used. Baling machines are known that bale forage products such as grass and other leaves used as animal feed; straw or other plant parts resulting as by-products from a harvesting operation such as combine harvesting; cotton; and other plant parts of commercial or other value. These and other materials are generically referred to herein, for the sake of simplicity, as "crop material."

A large baler may be a self-propelled machine having an engine, transmission, drive train, powered wheels, steerable wheels and an operator's cab. Other balers are configured to be towed behind an agricultural tractor that, under the control of an operator or using operator-monitored software, moves the baler about a field and provides power to operate internal parts of the baler. Power transfer is effected by way of a power take-off shaft connected to the power take-off that typically is part of the tractor, pressurized hydraulic fluid lines, electrical connections, and so on.

In operation, the baler moves about a field collecting crop material, and rolls the crop material into a tightly-compacted bale. The baler then wraps the bale in a wrap material, such as a plastic film or netting, and ejects the bale onto the ground for later collection.

After a round bale is ejected from a baler, the terrain affects the speed and direction of the bale. When ejecting on flat ground, the bale typically rolls out of the baler and comes to a stop at a generally predictable position along the baler travel path. However, when ejecting on a slope, the bale can pick up speed and change its direction of travel. A rolling bale can pick up speed and move to an inconvenient location for recovery, and present a hazard to nearby objects. To account for this problem, baler operators typically drive to a relatively flat location before ejecting the bale. This leads to increased operating time, excess fuel consumption, and generally reduced efficiency. While the foregoing problems are primarily present with round balers, square balers could conceivably suffer from similar issues.

The inventors have determined that improvements can be made to conventional agricultural balers to help mitigate or solve such problems.

This description of the background is provided to assist with an understanding of the following explanations of exemplary embodiments, and is not an admission that any or all of this background information is necessarily prior art.

SUMMARY OF THE INVENTION

In a first exemplary aspect, there is provided a method for ejecting a bale from an agricultural crop baler, the method comprising: opening a tailgate of the baler to a first tailgate position; ejecting a bale from a baling chamber; reducing or stopping rearward momentum of the bale moving the tailgate to a second tailgate position in which the tailgate is not in contact with the bale; moving the baler in a forward direction; and closing the tailgate without contacting the bale; wherein reducing or stopping rearward momentum of the bale comprises one or more of: opening the tailgate to the first tailgate position and stopping the tailgate at the first tailgate position with the bale in contact with the tailgate, then moving the tailgate to the second tailgate position, opening the tailgate at a reduced speed to the first tailgate position to be in contact with the bale, then opening the tailgate at an increased speed to the second tailgate position after the tailgate clears the bale, and positioning a tailgate ramp with an upper surface of the tailgate ramp horizontal or inclined downward in the forward direction to receive the bale on the upper surface as the bale ejects from the baling chamber.

In another exemplary aspect, there is provided a method for operating an agricultural crop baler, wherein the crop baler is configured to move in a forward direction across a ground surface and comprises a baling chamber and a tailgate configured to open in a direction opposite the forward direction, the method comprising: moving the baler in the forward direction on the ground surface while forming a first bale in the baling chamber; stopping movement of the baler in the forward direction; moving the tailgate in an opening direction to a first tailgate position in which the tailgate forms an opening dimensioned to allow the first bale to fall from the baling chamber, and the tailgate forms a gap with the ground having a first height; moving the tailgate in the opening direction to a second tailgate position in which the tailgate forms a gap with the ground having a second height, the second height being greater than the first height; resuming movement of the baler in the forward direction; and closing the tailgate. Reducing or stopping rearward momentum of the first bale as the bale falls from the baling chamber is performed by one or more of: pausing or decelerating movement of the tailgate in the opening direction upon reaching the first tailgate position, opening the tailgate at a reduced speed to the first tailgate position to be in contact with the bale, then opening the tailgate at an increased speed to the second tailgate position after the tailgate clears the bale, and positioning a tailgate ramp with an upper surface of the tailgate ramp horizontal or inclined downward in the forward direction to receive the bale on the upper surface as the bale ejects from the baling chamber.

In another exemplary aspect, there is provided an agricultural crop baler comprising: a frame; wheels rotatably mounted to the frame and configured to support the frame on a ground surface; a tailgate movably mounted to the frame between a closed position and an open position; a baling chamber defined between the frame and the tailgate, wherein the baling chamber is enclosed to hold a bale when the tailgate is in the closed position, and open to allow the bale to exit the baler along a bale ejection path when the tailgate is in the open position; and a control system comprising a processor and a memory storing code in a non-transient computer-readable form. Upon execution of the code by the processor, the control system is configured to operate the agricultural crop baler to: move the tailgate in an opening direction to a first tailgate position in which the tailgate forms an opening dimensioned to allow the bale to fall from the baling chamber, and the tailgate forms a gap with the ground having a first height; reduce or stop rearward momentum of the bale as the bale falls from the baling chamber by one or more of: pausing or decelerating movement of the tailgate in the opening direction upon reaching the first tailgate position, opening the tailgate at a reduced speed to the first tailgate position to be in contact with the bale, then opening the tailgate at an increased speed to the second tailgate position after the tailgate clears the bale, and positioning a tailgate ramp with an upper surface of the tailgate ramp horizontal or inclined downward in the forward direction to receive the bale on the upper surface as the bale ejects from the baling chamber; move the tailgate in the opening direction to a second tailgate position in which the tailgate forms a gap with the ground having a second height, the second height being greater than the first height; upon the tailgate reaching the second tailgate position, move the baler in the forward direction; and after moving the baler in the forward direction, close the tailgate.

BRIEF DESCRIPTION OF THE DRAWINGS

Embodiments of inventions will now be described, strictly by way of example, with reference to the accompanying drawings, in which.

In the figures, like reference numerals refer to the same or similar elements.

DETAILED DESCRIPTION OF THE DRAWINGS

The terms “forward”, “rearward”, “left” and “right”, when used in connection with the agricultural vehicle, agricultural baler, and/or components thereof are usually determined with reference to the direction of forward operative travel of the agricultural vehicle and/or agricultural baler, but they should not be construed as limiting. The terms “longitudinal” and “transverse” are determined with reference to the fore-and-aft direction of the agricultural vehicle and/or agricultural baler and are equally not to be construed as limiting. The terms “downstream” and “upstream” are determined with reference to the intended direction of crop material flow during operation, with “downstream” being analogous to “rearward” and “upstream” being analogous to “forward.”

Figure 1:
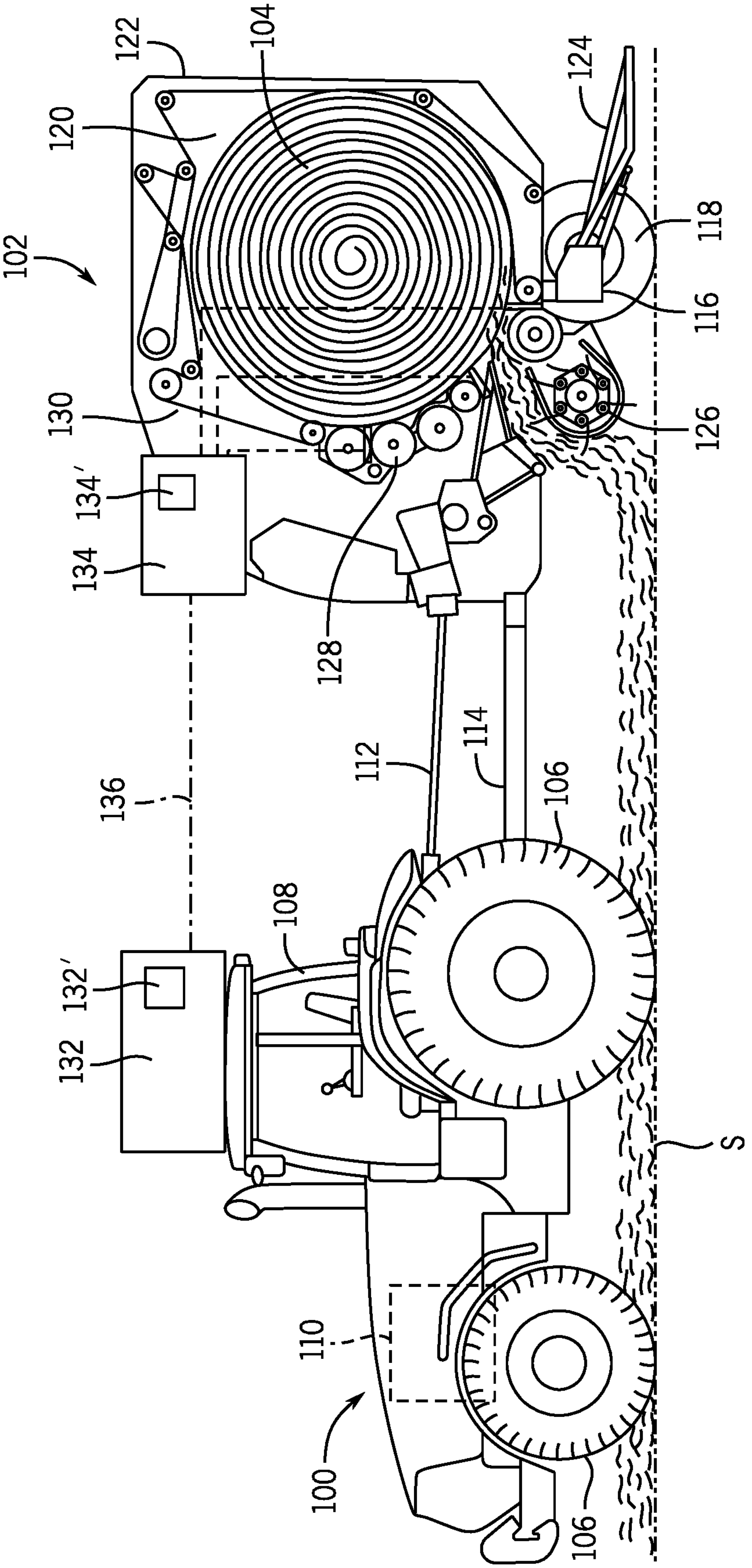
FIG. 1 illustrates an exemplary baler and tractor system.

FIG. 1 shows an embodiment of an agricultural vehicle 100 towing an agricultural baler 102 to perform a baling operation within a field. As shown, the work vehicle 100 can be configured as an agricultural tractor 100, such as an operator-driven tractor 100 or an autonomous tractor 100. However, in some embodiments, the work vehicle 100 may correspond to any other suitable vehicle configured to tow a baler across a field or that is otherwise configured to facilitate the performance of a baling operation. The agricultural vehicle 100 also may comprise baling vehicle having the baler 102 integrated with a vehicle frame having its own ground propulsion system, operator cab, and so on.

The shown baler 102 is configured as a round baler that forms round bales 104. However, in some embodiments, baler 102 may have any other suitable configuration, including being configured to generate square or rectangular bales.

The tractor 100 generally includes wheels 106, an operator cab 108, an engine 110, and a power take-off 112 that transmits power to the baler 102. A tongue and hitch assembly 114 or other tow equipment connects the tractor 100 to the baler 102 so that the tractor 100 can pull the baler 102 across the field, as known in the art.

The baler 102 generally includes a frame 116 that is supported by wheels 118 to roll on the ground G, a baling chamber 120, a tailgate 122, and a ramp 124 that is movably mounted to the frame 116 generally below the baling chamber 120 to vertically support the bale 104 as it is ejected. The baler 102 also includes conventional baling equipment, such as a crop collector 126 to lift crop material from the ground, rollers 128 and belts 130 that manipulate the crop material into a bale 104, as known in the art, and mechanisms for wrapping the bale.

The tailgate 122 is movably mounted to the frame between a closed position and an open position. When closed, the tailgate 122 and frame generally define the baling chamber 120, and the tailgate 122 (e.g., belts and other structures within the tailgate assembly) holds the bale 104 within the baling chamber 120. When the tailgate 122 is opened, the bale 104 can be ejected from the baler 102.

One or both of the tractor 100 and the baler 102 may include a respective control system 132, 134 comprising a processor, memory, a communication bus, input and output connections (wired and/or wireless), sensors 132', 134', user interfaces, and the like. The memory comprises a tangible computer readable medium, such as a magnetic medium (e.g., a computer hard drive), an optical medium (e.g., an optical disc), solid-state memory (e.g., flash memory), or other storage media known in the art. Software code or instructions that are tangibly stored on the memory, and the processor can load an execute such code or instructions to perform various operating steps such as described herein, and to generally control the operation of the tractor 100 and/or baler 102. Where the tractor 100 and baler 102 have their own respective control systems 132, 134, the two control systems 132, 134 may be communicatively coupled by wired or wireless communication links 136 (e.g., a wired ISOBUS connection).

The sensors 132', 134' may include inclinometers (e.g., multi-axis accelerometers), global positioning system (GPS) or other position tracking sensors, ground speed sensors, and so on.

It will be appreciated that any of the functionality performed by the control system(s) 132, 134 described herein, such as the methods of operation described below, is implemented in software code or instructions that are tangibly stored on the tangible computer readable medium. Upon loading and executing such software code or instructions into a processor, the control system(s) 132, 134 may perform any of the functionality of the control system(s) 132, 134 described herein, including any steps of the methods described herein.

The term “software code” or “code” used herein refers to any instructions or set of instructions that influence the operation of a computer or controller. They may exist in a computer-executable form, such as machine code, which is the set of instructions and data directly executed by a computer’s central processing unit or by a controller, a human-understandable form, such as source code, which may be compiled in order to be executed by a computer’s central processing unit or by a controller, or an intermediate form, such as object code, which is produced by a compiler.

As used herein, the term "software code" or "code" also includes any human-understandable computer instructions or set of instructions, e.g., a script, that may be executed on the fly with the aid of an interpreter executed by a computer's central processing unit or by a controller.

As noted above, a bale 104 that is ejected from a baler 102 can begin to roll after it leaves the baler 102. The inventors have determined that the likelihood of such rolling (or the speed of the roll) can be controlled in some cases by operating the baler 102 to reduce or stop rearward momentum of the bale 104 as it is ejected. In general terms, the ejection of the bale 104 can be controlled by using the tailgate 122 and/or the ramp 124 to hold or decelerate the bale 104 as it exits the baling chamber 120. Examples of this operation are described in relation to FIGS. 2-7.

Figure 2:
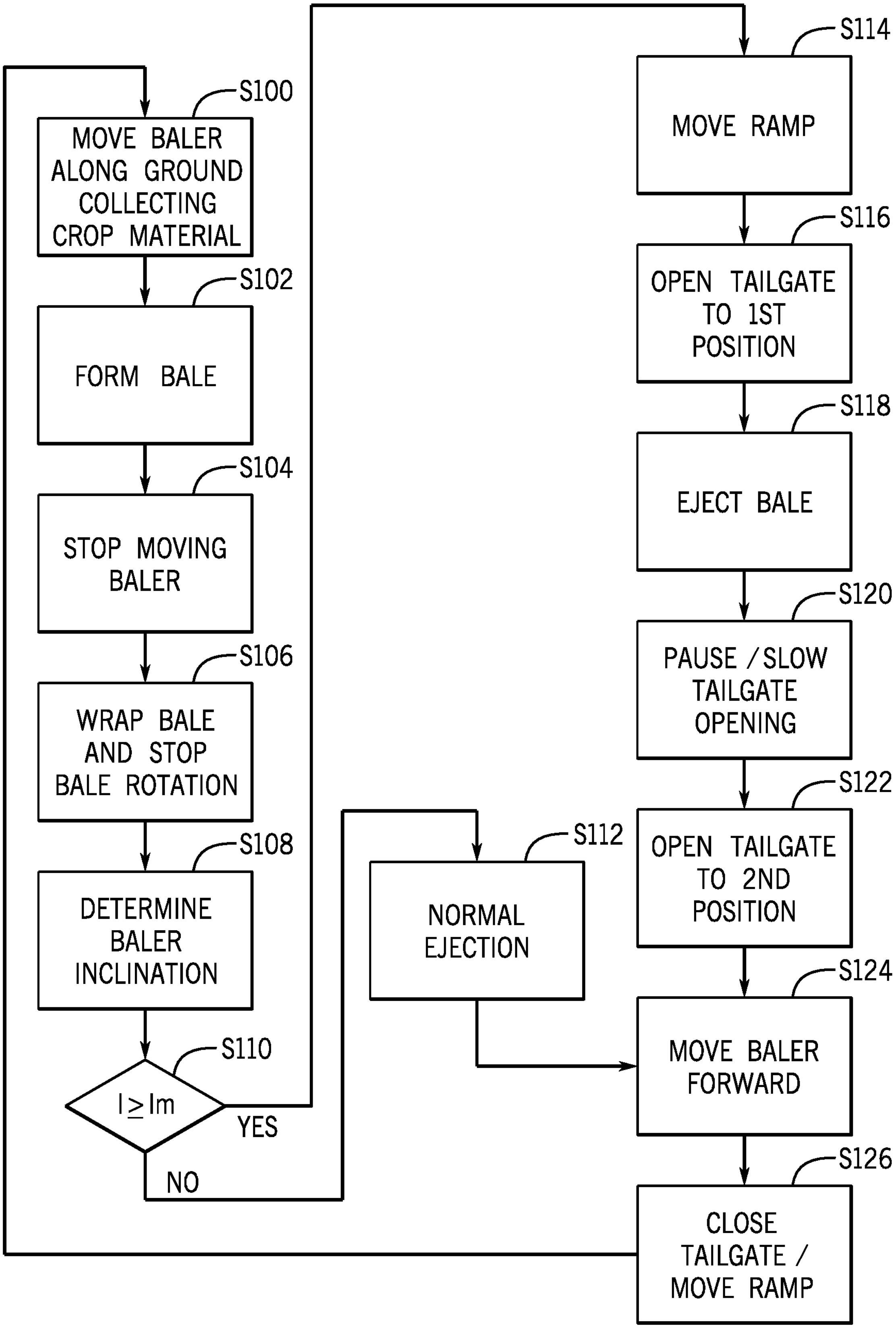
FIG. 2 is a flowchart of an exemplary method for operating a baler.

FIG. 2 illustrates an exemplary method for operating a baler 102. One or more of the steps of this method can be performed in any functional order (including overlapping steps), and may be performed by one or more control systems 132, 134 operating individual, in unison, or in concert with an external control system (e.g., a cloud-based controller). One or more of the method steps alternatively may be performed manually by an operator of the baler 102.

Figure 3:
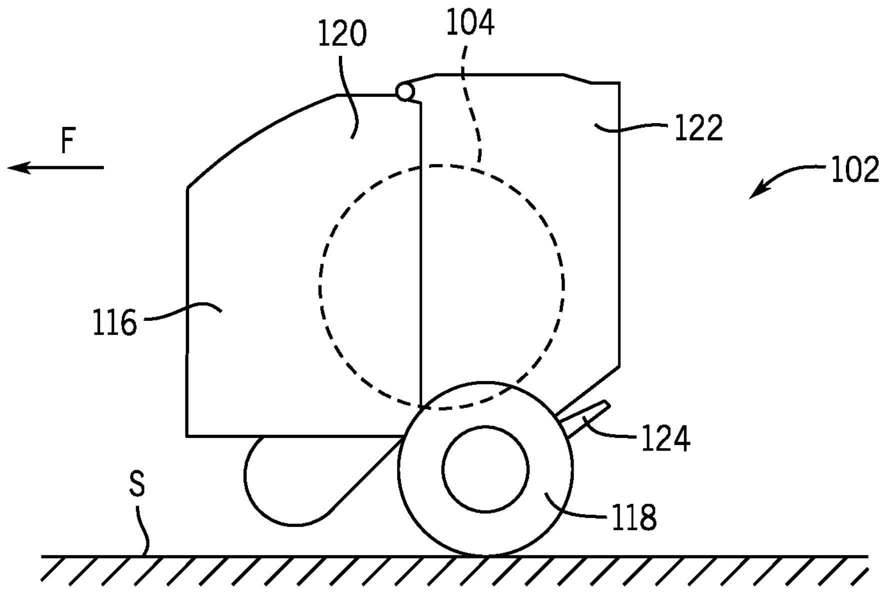
FIG. 3 is a schematic side view of a baler operating in a first condition.

In step S100, the baler 102 is moved across the ground surface S in a forward direction F (see FIG. 3) collecting crop material, and in step S102 the baler 102 operates the belts 130, rollers 128, and other equipment to form a bale 104. In step S104, the baler stops moving on the ground, and in step S106 the baler 104 wraps the bale in twine, plastic, or the like and then optionally operates a declutch mechanism or the like (e.g., slows or stops a power take-off) to stop the baler machinery from rotating. Steps S100 to S106 are generally conventional and need no further explanation herein. FIG. 3 shows a baler 102 with a fully-formed bale 104 within the baling chamber 120.

In step S108, the inclination of the baler 102 on the ground S is determined using an inclinometer or other sensor 132', 134'. The sensor preferably comprises an inclinometer in the baler 102 itself. Alternatively, the inclination can be derived using known information from a GPS map or other database of information correlating the baler position and orientation with a known inclination.

In step S110, the baler inclination I is compared to a threshold inclination value $I_m$. The threshold inclination value $I_m$ is selected to represent a value at which it is desirable to take additional steps to help prevent the bale 104 from rolling down the inclination. For example, $I_m$ may equal 5° or more, 10° or more, or any other desired value. The value for $I_m$ may be variable to account for operating conditions. For example, some crop conditions (e.g., wet ground, certain crop types, etc.), it may be more likely that the bale 104 will roll down the inclination. In those cases, the value for $I_m$ may be lowered. Modifications to the value for $I_m$ may be made manually by the operator or automatically by the control system 132, 134.

If the inclination I is less than the threshold inclination value $I_m$, the process moves to step S112, in which a normal bale ejection process is used. The normal process may comprise, for example, raising the tailgate 122, moving the bale ramp 124 to a position to guide the bale 104 as it exits the baling chamber 120, driving the baler 102 forward, closing the tailgate 122, and moving the ramp 124 back to the driving position.

In some embodiments, steps S108 and S110 may be omitted. In such cases, the baler 102 may always operate according a modified bale ejection method according to the following steps, or other conditions may be required to initiate a modified bale ejection method. For example, the operator may select whether or not to use the modified bale ejection method regardless of any inclination conditions.

If the inclination I is greater than or equal to the threshold inclination value $I_m$, the process moves forward using a modified bale ejection method. In step step S114, the ramp 124 may, if necessary, be moved to a position in which it does not significantly increase the rearward momentum of the bale 104 or push the bale 104 away from the baler 102 as the bale 104 exits the baling chamber 120. This may be a position in which the ramp 124 may be operated during a normal bale ejecting process (e.g., fully-lowered). However, in some cases the ramp 124 may be constructed such that it can move to a position that is not used during normal bale ejecting. For example, the ramp 124 may be movable in the forward direction F to be completely out of contact with the bale 104 as the bale 104 ejects. Any suitable mechanism or arrangement may be used for this purpose. For example, the ramp 124 may be foldable or slidable relative to the baler frame 116 using conventional mechanisms.

Figure 4:
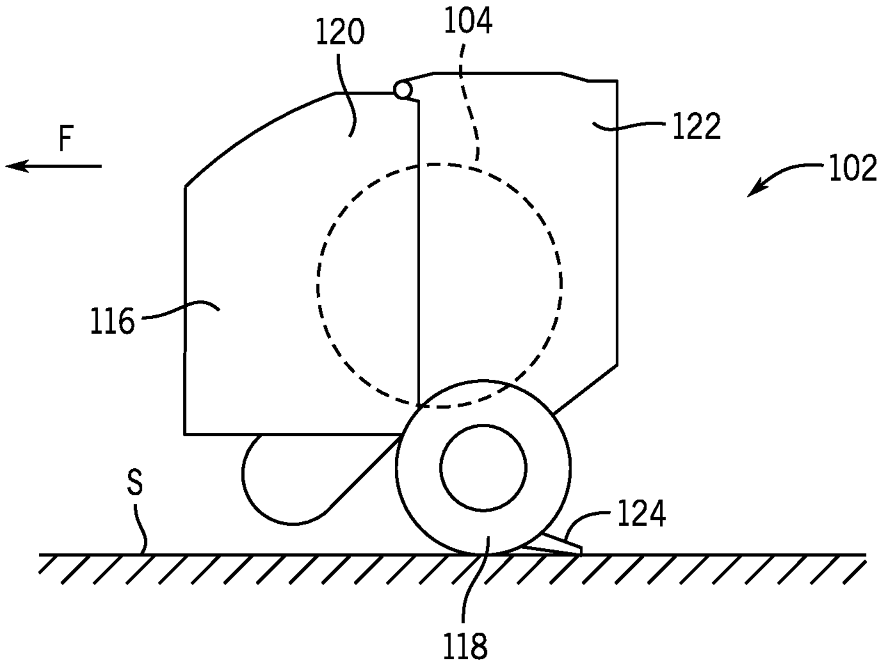
FIG. 4 is a schematic side view of the baler of FIG. 3 operating in a second condition.

FIG. 4 shows a baler 102 with the ramp 124 is moved to a lowered position in which the bale 104 does not contact or makes only slight contact with the ramp 124 as the bale 104 ejects to thereby reduce directing the bale 104 rearwards.

Figure 8:
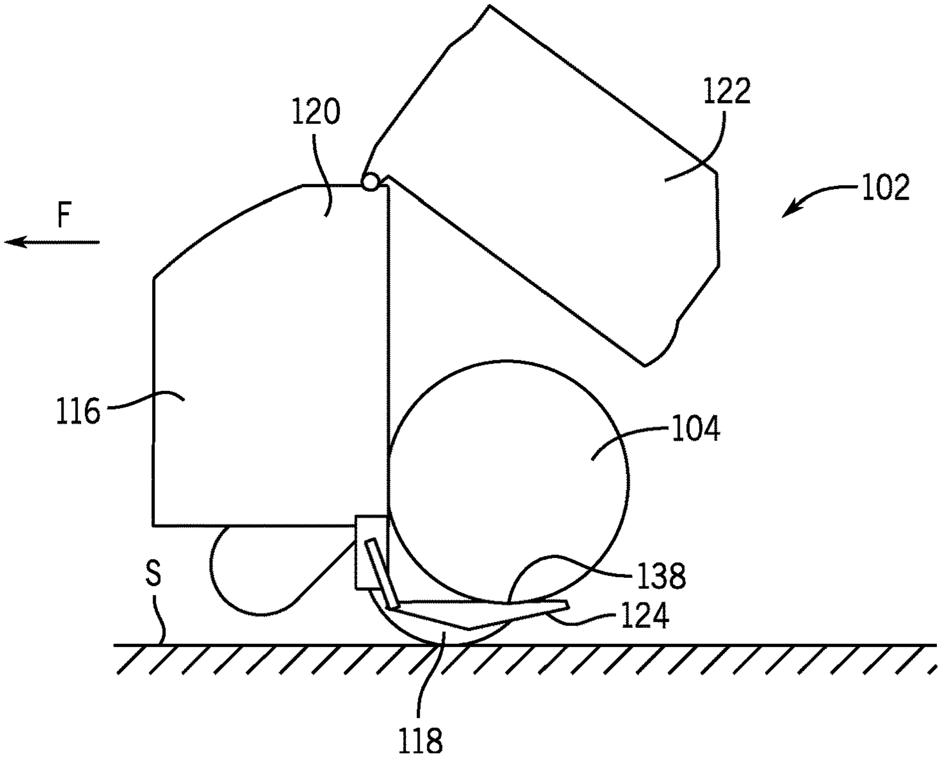
FIG. 8 is a schematic side view of a baler having a ramp with an upper ramp surface oriented horizontally.
Figure 9:
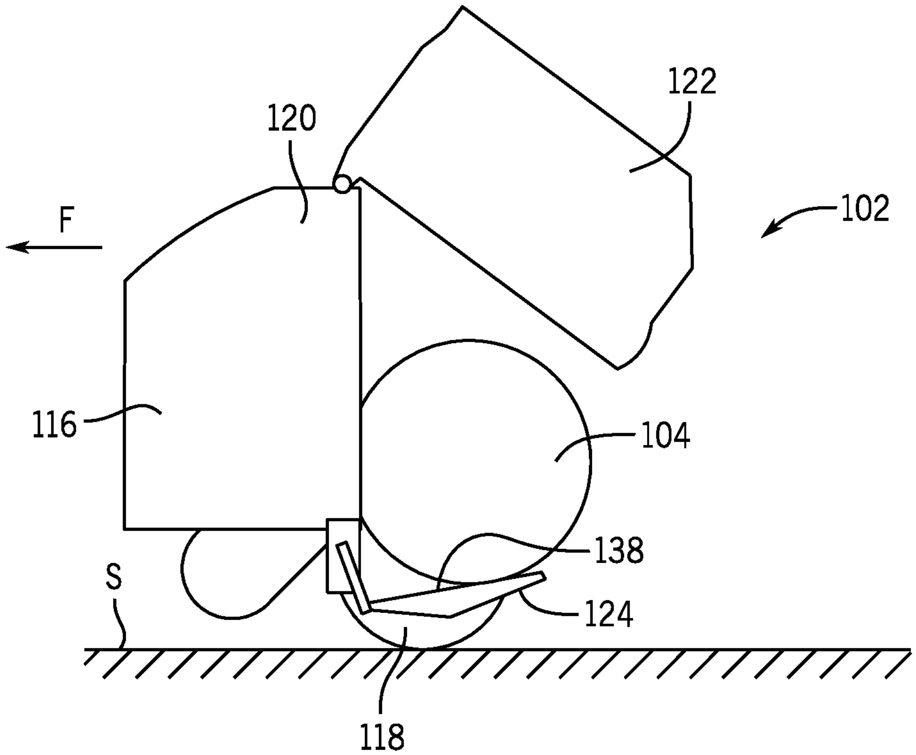
FIG. 9 is a schematic side view of a baler having a ramp with an upper ramp surface inclined downward in the forward direction.

In some embodiments, the ramp 124 may be moved to a position in which it assists with slowing the motion of the bale 104. For example, the ramp 124 may be movable to a position in which an upper ramp surface 138 is horizontal (see FIG. 8) or inclined downward in the forward direction (see FIG. 9), so that the bale 104 tends to come to a rest or slow down when striking the upper ramp surface 138. Any ramp position in which the upper ramp surface 138 is not inclined downward in the rearward direction may be helpful for this function. As with other embodiments, any suitable arrangement of actuators and linkages may be used to provide a ramp 124 with this capability.

Figure 5:
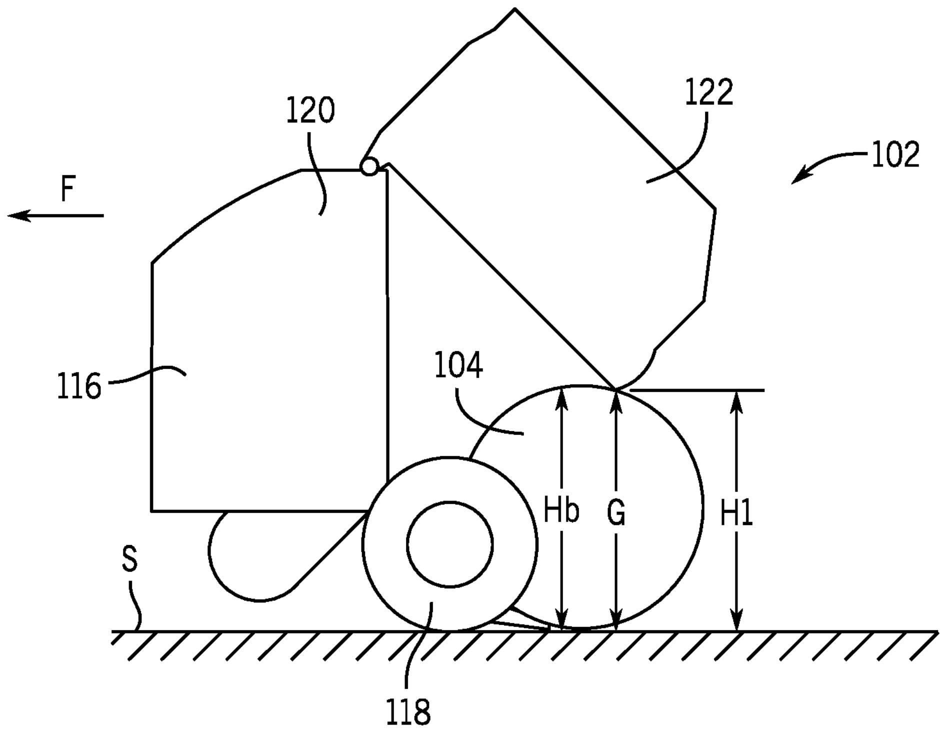
FIG. 5 is a schematic side view of the baler of FIG. 3 operating in a third condition.

In step S116, the tailgate 122 is moved in an opening direction (e.g., pivoted about a horizontal axis at or near the top of the baler 102) until it reaches a first position, such as shown in FIG. 5. The first position is selected such that the tailgate 122 is sufficiently open to allow the bale 104 to fall out of the baling chamber 120, and the tailgate 122 forms an gap G with the ground having a first height H1. The first height is selected to be greater than height Hb of the bale 104. Thus, the bale 104 either comes into contact with the tailgate 122 immediately upon falling out of the baling chamber 120, or upon rolling backwards after falling onto the ground S.

In step S118, the bale 104 is ejected from the baling chamber 120. Step 118 may occur simultaneously with step S116, as the movement of the tailgate 122 can allow the bale 104 to start falling.

In step S120, the movement of the tailgate 122 in the opening direction is stopped or slowed. The stopping or slowing of the tailgate 122 is performed so that the tailgate 122 stops or impedes the movement of the bale 104 long enough for the bale 104 to come to rest on the ground, and thus become less subject to rolling down an incline. The movement of the tailgate 122 may be stopped in all cases. For example, the tailgate 122 may be stopped for a predetermined amount of time (e.g., 5 seconds). In other cases, logic may be provided to determine whether or not to fully stop the tailgate 122. For example, the tailgate 122 may be stopped whenever the when the incline is above a second threshold value that is greater that $I_m$. The movement of the tailgate 122 may be slowed if it is determined that it is not necessary to fully stop the tailgate 122 in order to prevent the bale 104 from rolling out of control along the ground S. Various factors may be used to determine whether to stop or slow the tailgate 122 in step S120. For example, bales having less mass may tend to have less inertia upon falling to the ground S, and thus might not require fully stopping the tailgate 122. Other variables will be apparent with further evaluation and practice of the present disclosure.

Figure 6:
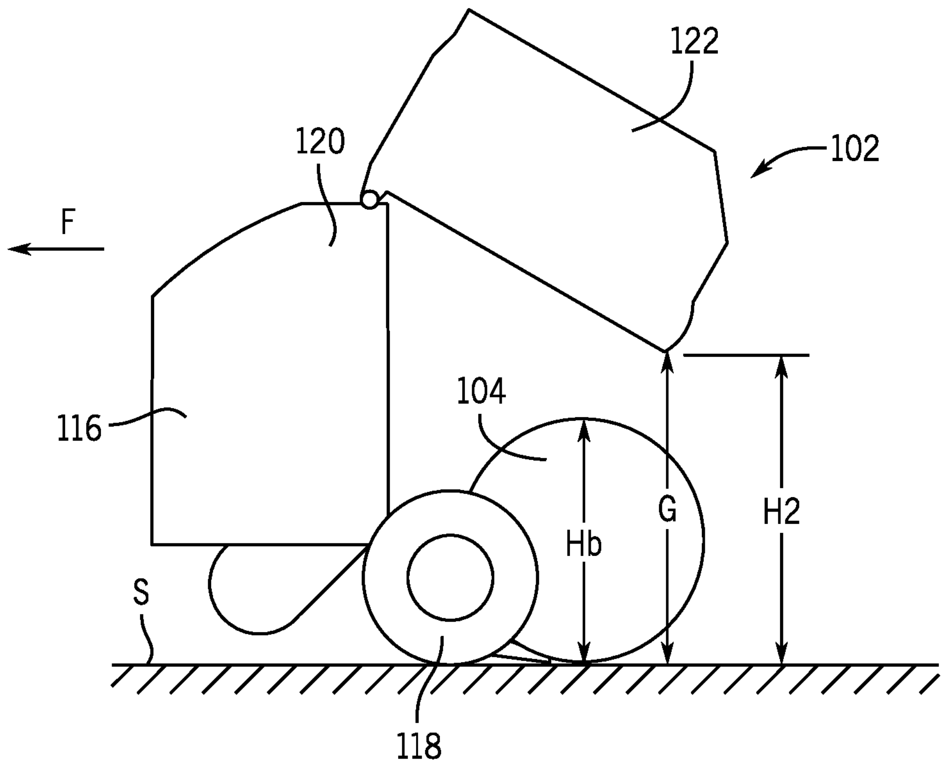
FIG. 6 is a schematic side view of the baler of FIG. 3 operating in a fourth condition.

In step S122, the tailgate is moved in the opening direction to a second tailgate position in which the tailgate 122 forms a gap G with the ground having a second height H2. FIG. 6 shows this arrangement. The second height H2 is greater than the first height H1, and is selected to also be greater than the bale height Hb.

Figure 7:
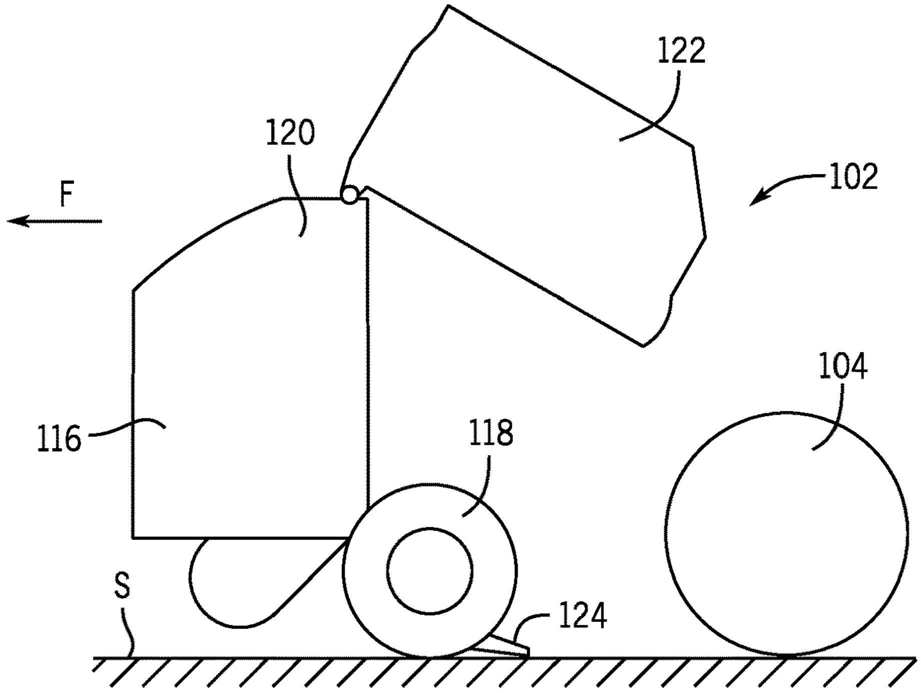
FIG. 7 is a schematic side view of the baler of FIG. 3 operating in a fifth condition.

In step S124, the baler 104 is moved in the forward direction F along the ground S, until the tailgate 122 clears the bale 104, such as shown in FIG. 7. Then, at step S126, the tailgate 122 is closed, the ramp 124 is moved back to its normal travel position, and the baling mechanisms are reactivated if they had previously been deactivated or slowed (e.g., by operating a declutch mechanism or otherwise increasing or applying power to the baler mechanisms) to continue baling crop material. The baler 102 may then continue back to step S100 to perform normal baling operations, or be driven to inter-operative storage.

Referring back to step S112, during normal bale ejecting operation, the baler 102 may move the tailgate 122 directly to the second tailgate position in one continuous motion. The tailgate 122 may be opened at different speeds, depending on whether or not normal ejection is being performed. For example, in step S112, the tailgate 122 may be moved to the second tailgate position at a first speed (e.g., a maximum opening speed), while in step S116 the tailgate 122 may be moved to the first position at a second speed that is slower than the first speed. Operating the tailgate in step S116 at a relatively slow speed in this step is expected to help control the manner in which the bale 104 exits the baling chamber 120 and lands on the ground S, and thus reduce any momentum that the bale 104 might have. The lower second speed also may be used in step S122 when moving the tailgate 122 from the first position to the second position, but this is not strictly necessary.

The foregoing method may be modified in various ways, in addition to those described above. For example, in some cases, like that of FIG. 8, the baler 102 may be constructed with a ramp 124 that slows or stops the bale 104 as the bale 104 ejects. In such cases, it may not be necessary to use the tailgate 122 to slow or stop be bale 104, and therefore steps S116 to S120 may be omitted, and the tailgate 122 may be opened directly to the second position.

In other cases, the tailgate 122 can be operated according to different movement speed profiles to control the ejection of the bale 104. For example, step S116 may be performed by slowly opening the tailgate 122 to the first position to prevent the bale 104 from gathering inertia as it falls from the baling chamber 120. In this case, it may not be necessary to perform step S120. Instead, the tailgate 122 can simply continuously move to the second position, or the tailgate 122 may be accelerated after the tailgate 122 is raised far enough to clear the bale 104. Other alternatives and embodiments will be apparent to persons of ordinary skill in the art in view of the present disclosure.

Embodiments may include one or more sensors to detect the position of the bale 104 during ejection. For example, an optical sensor (e.g., break-beam sensors or IR reflective sensors) or ultrasonic sensors (e.g., ultrasonic transceivers) may be used to continuously or intermittently track the bale 104 as it moves from the baling chamber 120 to the ground S. As another example, a contact sensor (e.g., capacitive touch sensors, microswitches, etc.) may be provided in the tailgate 122 to determine when the bale 104 is contacting the lower end of the tailgate 122. Such position sensors can be integrated into operating controls to affect how the bale ejection process operates. For example, the tailgate 122 may be fully stopped in step S120 for a fixed period of time after the operator or a control system 132, 134 determines that the bale 104 has exited the baling chamber 120, or that the bale 104 has contacted the tailgate 122.

Embodiments also may include one or more sensors to determine the opening status of the tailgate 122. For example, a position sensor (e.g., linear or angular potentiometer) may be operatively connected between the tailgate 122 and the baler frame 116, and configured to output a signal indicative of the position of the tailgate 122 relative to the frame 116. Such a sensor can be used to provide feedback to the operator (e.g., via a user interface) or to a control system 132, 134 to allow the operator or control system 132, 134 to stop the tailgate 122 in the first position and the second position.

The present disclosure describes a number of inventive features and/or combinations of features that may be used alone or in combination with each other or in combination with other technologies. Such features may be used in any useful combination, and the appearance of a particular feature in combination with another particular feature in the embodiments is not intended to suggest that such features cannot be used in alternative combinations with other features. The embodiments described herein are all exemplary, and are not intended to limit the scope of the claims. It will be appreciated that various aspects of the embodiments described herein may be provided as component parts or as subassemblies. It will also be appreciated that the inventions described herein can be modified and adapted in various ways, and all such modifications and adaptations are intended to be included in the scope of this disclosure and the appended claims.

It will also be understood that the description herein and the claims describe features that may be combined with other features not specifically described. Also, features identified in the singular or by a specific number are not intended to be limited to a single features or the described number of features unless specifically recited as being present only in the specified quantity.

The invention claimed is:

1. A method for ejecting a bale from an agricultural crop baler, the method comprising:

wrapping the bale in a wrap material prior to ejecting the bale from a baling chamber of the agricultural crop baler;

opening a tailgate of the agricultural crop baler to a first tailgate position;

ejecting the bale from the baling chamber;

reducing or stopping rearward momentum of the bale;

moving the tailgate to a second tailgate position in which the tailgate is not in contact with the bale;

moving the agricultural crop baler in a forward direction; and closing the tailgate without contacting the bale;

wherein reducing or stopping rearward momentum of the bale comprises one or more of:

opening the tailgate at a reduced speed from a closed position to the first tailgate position to be in contact with the ejected bale that is positioned outside of the baling chamber, then further opening the tailgate at an increased speed from the first tailgate position to the second tailgate position after the tailgate clears the bale, and moving a baler ramp from a first ramp position in which an upper surface of the baler ramp is inclined upward, as viewed in the forward direction, prior to ejection of the bale from the baling chamber to a second ramp position in which the upper surface of the baler ramp is horizontal or inclined downward, as viewed in the forward direction, to receive the bale on the upper surface as the bale ejects from the baling chamber.

2. The method of claim 1, further comprising determining an inclination of the agricultural crop baler before opening the tailgate to the first tailgate position.

3. The method of claim 1, wherein reducing or stopping rearward momentum of the bale comprises opening the tailgate at the reduced speed from the closed position to the first tailgate position to be in contact with the ejected bale that is positioned outside of the baling chamber, then further opening the tailgate at the increased speed from the first tailgate position to the second tailgate position after the tailgate clears the bale.

4. A method for operating an agricultural crop baler, wherein the agricultural crop baler is configured to move in a forward direction across a ground surface and comprises a baling chamber and a tailgate configured to open in a direction opposite the forward direction, the method comprising:

moving the agricultural crop baler in the forward direction on the ground surface while forming a first bale in the baling chamber;

wrapping the first bale prior to ejecting the first bale from the baling chamber;

stopping movement of the agricultural crop baler in the forward direction;

moving the tailgate in an opening direction to a first tailgate position in which the tailgate forms an opening dimension to allow the first bale to fall and eject from the baling chamber, and the tailgate forms a gap with the ground surface having a first height;

reducing or stopping rearward momentum of the first bale as the first bale falls from the baling chamber by one or more of:

opening the tailgate at a reduced speed from a closed position to the first tailgate position to be in contact with the first bale that is positioned outside of the baling chamber, then further opening the tailgate at an increased speed from the first tailgate position to a second tailgate position after the tailgate clears the first bale, and moving a baler ramp from a first ramp position in which an upper surface of the baler ramp is inclined upward, as viewed in the forward direction, prior to ejection of the first bale from the baling chamber to a second ramp position in which the upper surface of the baler ramp is horizontal or inclined downward, as viewed in the forward direction, to receive the first bale on the upper surface as the first bale ejects from the baling chamber;

moving the tailgate in the opening direction to the second tailgate position in which the tailgate forms a gap with the ground surface having a second height, the second height being greater than the first height;

resuming movement of the agricultural crop baler in the forward direction; and closing the tailgate.

5. The method of claim 4, further comprising, prior to moving the tailgate in the opening direction to the first tailgate position:

measuring an inclination of the agricultural crop baler and determining that the inclination is equal to or greater than a predetermined value.

6. The method of claim 5, further comprising:

moving the agricultural crop baler in the forward direction on the ground surface while forming a second bale in the baling chamber;

stopping movement of the agricultural crop baler in the forward direction;

stopping formation of the second bale in the baling chamber;

measuring the inclination of the agricultural crop baler and determining that the inclination is less than the predetermined value;

moving the tailgate in the opening direction directly to the second tailgate position;

resuming movement of the agricultural crop baler in the forward direction; and closing the tailgate.

7. The method of claim 4, wherein:

moving the tailgate in the opening direction to the first tailgate position comprises moving the tailgate at a first opening speed; and moving the tailgate in the opening direction directly to the second tailgate position comprises moving the tailgate at a second opening speed, wherein the second opening speed is greater than the first opening speed.

8. The method of claim 4, further comprising, after reaching the first tailgate position:

detecting a bale position of the first bale upon ejecting the first bale; and before moving the tailgate to the second tailgate position, determining that the first bale is at a predetermined bale position.

9. The method of claim 4, wherein the method further comprises:

prior to or during moving the tailgate to the first tailgate position, moving the baler ramp from the first ramp position to the second ramp position; and moving the baler ramp to the first ramp position after resuming movement of the agricultural crop baler in the forward direction.

10. The method of claim 4, wherein moving the tailgate in the opening direction to the first tailgate position comprises moving the tailgate at an opening speed that is less than a maximum opening speed of the tailgate.

11. The method of claim 4, wherein pausing or decelerating movement of the tailgate in the opening direction comprises stopping the tailgate in the second tailgate position.

12. An agricultural crop baler comprising:

a frame;

wheels rotatably mounted to the frame and configured to support the frame on a ground surface;

a tailgate movably mounted to the frame between a closed position and an open position;

a baling chamber defined between the frame and the tailgate, wherein the baling chamber is enclosed to hold a bale when the tailgate is in the closed position, and open to allow the bale to exit the agricultural crop baler along a bale ejection path when the tailgate is in the open position; and a control system comprising a processor and a memory storing code in a non-transient computer-readable form, wherein, upon execution of the code by the processor, the control system is configured to operate the agricultural crop baler to:

move the tailgate in an opening direction to a first tailgate position in which the tailgate forms an opening dimension to allow the bale to fall from the baling chamber, and the tailgate forms a gap with the ground surface having a first height;

reduce or stop rearward momentum of the bale as the bale falls from the baling chamber by opening the tailgate at a reduced speed from the closed position to the first tailgate position to be in contact with the bale that is positioned outside of the baling chamber, then further opening the tailgate at an increased speed from the first tailgate position to a second tailgate position after the tailgate clears the bale;

move the tailgate in the opening direction to the second tailgate position in which the tailgate forms a gap with the ground surface having a second height, the second height being greater than the first height;

upon the tailgate reaching the second tailgate position, move the agricultural crop baler in a forward direction; and after moving the agricultural crop baler in the forward direction, close the tailgate.

13. The agricultural crop baler of claim 12, further comprising an inclination sensor configured to indicate an inclination of the agricultural crop baler on the ground surface, and wherein the control system is further configured to:

read an inclination value from the inclination sensor; and prior to moving the tailgate to the first tailgate position, determine that the inclination value is greater than or equal to a predetermined value.

14. The agricultural crop baler of claim 12, wherein moving the tailgate in the opening direction to the first tailgate position comprises moving the tailgate at an opening speed that is less than a maximum opening speed of the tailgate.

15. The agricultural crop baler of claim 12, wherein pausing or decelerating movement of the tailgate in the opening direction comprises stopping the tailgate in the second tailgate position.

16. The method of claim 4, wherein reducing or stopping rearward momentum of the first bale as the first bale falls from the baling chamber comprises opening the tailgate at the reduced speed from the closed position to the first tailgate position to be in contact with the first bale that is positioned outside of the baling chamber, then further opening the tailgate at the increased speed from the first tailgate position to the second tailgate position after the tailgate clears the first bale.

* * * * *